Figures 1, 2:
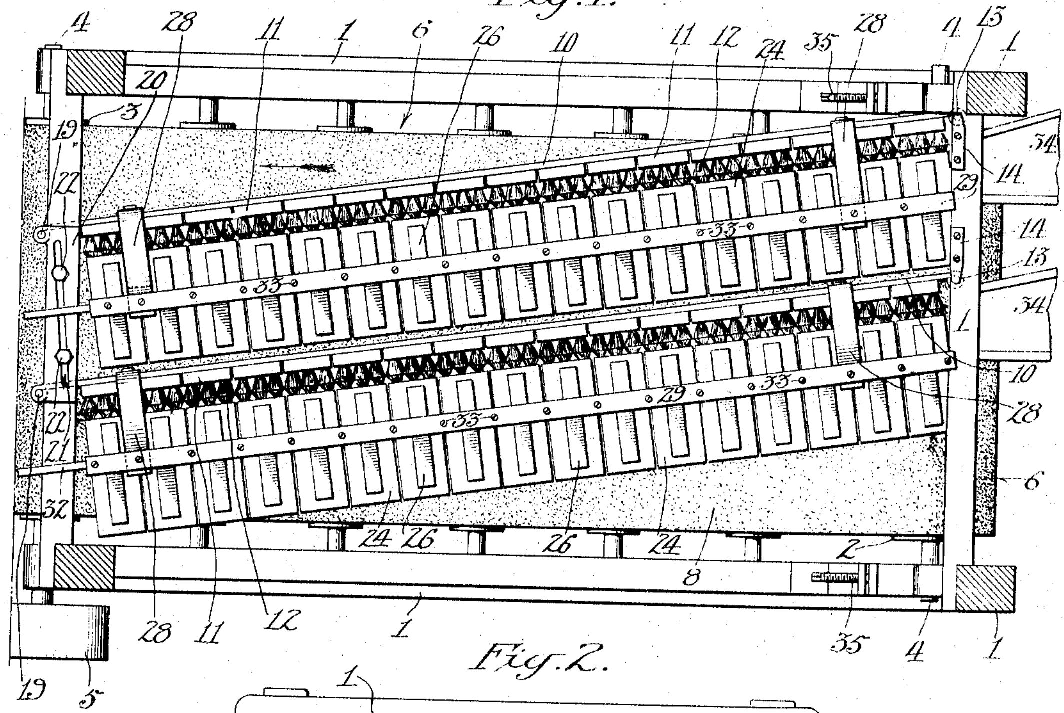

F. STEBLER.

FRUIT CLEANER.

APPLICATION FILED MAR. 20, 1907.

928,559.

Patented July 20, 1909.

3 SHEETS—SHEET 1.

Witnesses:—

Frank L. A. Graham

Louis W. Gratz

Inventor:

Fred Stebler.

By Townsend, Lyon Hackley & Knight his attys

F. STEBLER.
FRUIT CLEANER.
APPLICATION FILED MAR. 20, 1907.
928,559.
Patented July 20, 1909.
3 SHEETS—SHEET 2.
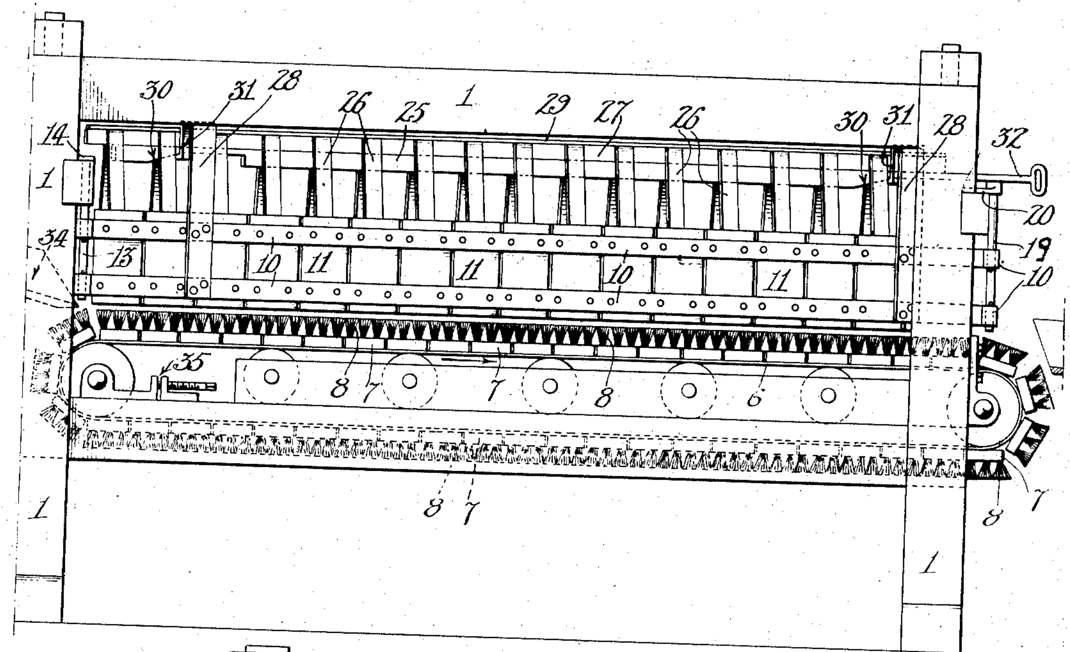
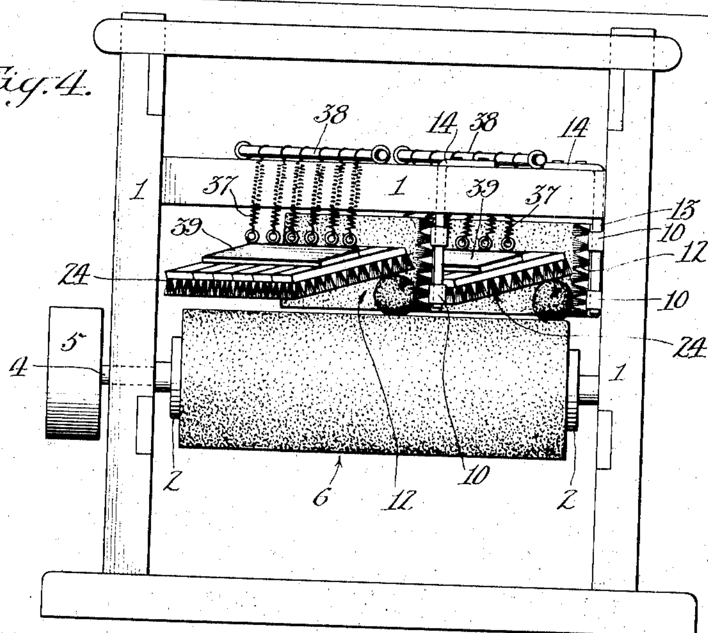
Witnesses:—
Frank L. A. Graham
Louis W. Gratz
Inventor;
Fred Stebler.
By Townsend, Lyon, Hackley & Knight
his attys

F. STEBLER.
FRUIT CLEANER.
APPLICATION FILED MAR. 20, 1907.

928,559. Patented July 20, 1909.

3 SHEETS—SHEET 3.

Witnesses:—
Frank L. A. Graham
Louis W. Gratz

Inventor,
Fred Stebler,
By Townsend, Lyon, Hackley & Knight
his Attys

UNITED STATES PATENT OFFICE.

FRED STEBLER, OF RIVERSIDE, CALIFORNIA.

FRUIT-CLEANER.

No. 928,559. Specification of Letters Patent. Patented July 20, 1909.

Application filed March 20, 1907. Serial No. 363,516.

*To all whom it may concern:*

Be it known that I, FRED STEBLER, a citizen of the United States, residing at Riverside, in the county of Riverside and State of California, have invented a new and useful Fruit-Cleaner, of which the following is a specification.

This invention relates to fruit cleaners of the class wherein the fruit is carried forward between brushes and is subjected to cleaning action by the brushes.

The main object of the invention is to provide for effectively pressing the fruit against the brushes, or the brushes against the fruit, equally and uniformly on large and small fruit to insure thorough cleaning.

Another object of the invention is to control the amount of such pressure.

A further object of the invention is to provide for cleaning and brushing fruit thoroughly, irrespective of size or shape.

It is a well known fact that many fruits, such as oranges, accumulate more dust and dirt at their tapering and irregular stem ends than at other portions, and in passing such fruit between cleaning brushes, there is a tendency for the fruit to rotate on its portion of smallest diameter so that the more projecting and irregular portions which require cleaning the most, are kept away from the brushes.

The object of my invention in this connection is to bring all portions of the fruit in contact with the brushes, so that the stem or irregular portions are cleaned as effectively as the rounder portions.

The invention comprises a longitudinally-traveling conveyer on which the fruit is carried and deflecting brush means extending obliquely to the path of movement of said conveyer and by which the fruit is brushed and directed against a vertically disposed brush means for brushing the ends of the fruit.

The invention further comprises brush means above the fruit-carrying conveyer to press the fruit thereon toward the said deflecting brush means.

A further object is to provide an open sided brushing conduit or channel having its top formed by brushing means, which may preferably be formed of independent members and also may preferably be vertically movable or each member, if more than one be employed, may be vertically movable, whereby the fruit to be brushed may enter the conduit at any point and will be held against the vertical brush means forming the wall of the conduit. This also insures the rotation of the fruit on all its axes insuring its brushing at all points.

Figure 5:
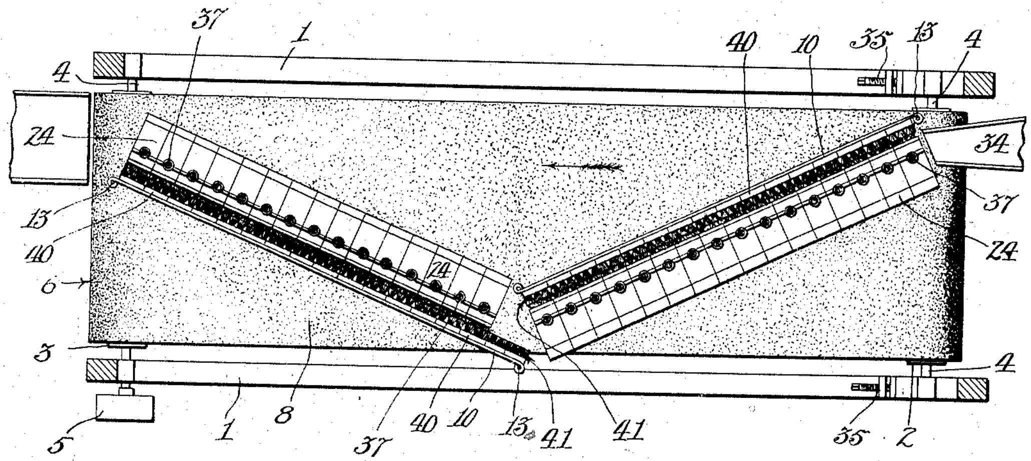
Figure 6:
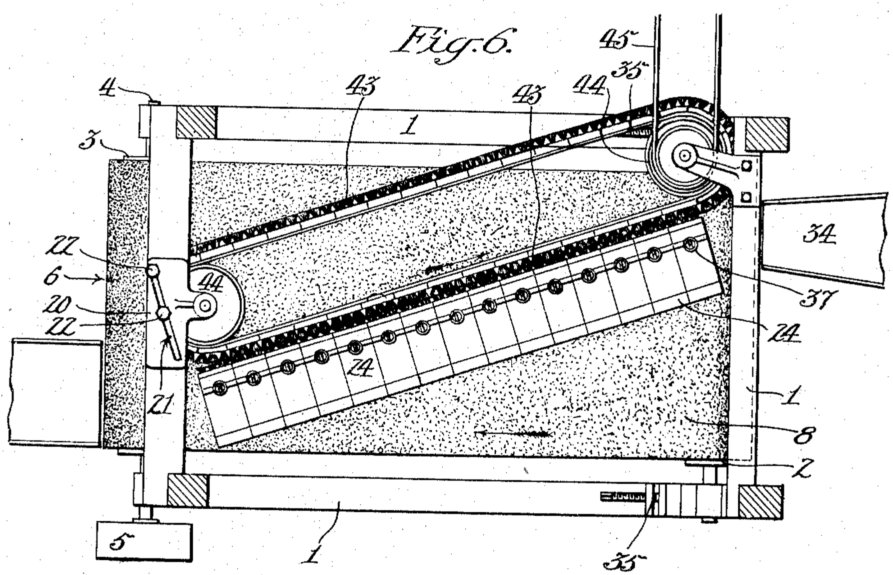

In the accompanying drawings:—Figure 1 is a plan of the machine. Fig. 2 is an end elevation. Fig. 3 is a side elevation. Fig. 4 is an end elevation of a different form of the invention. Fig. 5 is a plan of a form of the invention wherein a plurality of deflectors are provided operating successively. Fig. 6 is a plan of a form of the invention wherein the deflector moves longitudinally in opposition to the movement of the carrier.

1 designates a frame on which are supported two drums 2, 3, whose shafts 4 are mounted to rotate in bearings in the frame, one of said shafts having driving means such as a pulley 5. Over these drums runs a conveyer means 6, consisting, for example, of an apron connected to the strips or backs 7 of brushes 8, said brushes extending outwardly from the apron or conveyer so as to form a continuous brush surface, which, at the top of the conveyer, is presented upwardly to form an upwardly exposed brush surface on which the fruit rests and is carried forward in the longitudinal rectilinear motion of the conveyer. Above this brush surface are supported one or more deflector means, each consisting, for example, of two longitudinally extending bars 10 connected by the strips or backs 11 of vertical brush means 12, said bars being pivoted or hinged at one end by pivot rod 13 to brackets 14 on the frame 1 and pivoted at their other ends to rod or pin 19 on a plate 20, said plate having a slot 21 to receive fastening bolts or screws 22 to fasten the deflectors at any desired angle to the longitudinal direction of motion of the conveyer so that each deflector extends above and obliquely across a portion of the endless belt or conveyer.

Above the conveyer are also provided upper brush means for pressing the fruit downwardly onto the conveyer brush surface and laterally toward the deflector brush surface, said means consisting of brushes 24 supported by flexible means such as straps 26 extending over bars 27, which rest on the supporting brackets 28 extending laterally from the bars 10. Said brushes 24 extend obliquely downward and outward, or dip away from the vertical deflector brush means 12 so that their brush surfaces face obliquely downward and toward the deflector. Straps 26 are pinched on to bar 27 by a clamp bar 29 fastened by screws 33 and on loosening this clamp bar the straps can be slipped through to vary the angle of inclination or dip of the brushes. In order to enable vertical adjustment of these upper brushes 24, the adjusting bars 25 for bars 27 are provided, with inclines 30 engaging with notches or seats 31 in said brackets 28, so that by longitudinal movement of the bars they can be raised or lowered, such movement being effected, for example, by means of pusher rods 32 extending from the bars 27.

34 designates chutes for feeding the fruit to the conveyer at one end thereof. Any suitable delivery means, not shown, may be provided for taking the fruit from the other end of the conveyer.

35 designates tightener means for the conveyer.

The operation is as follows:—The fruit being supplied to the conveyer by the said chutes, is carried longitudinally of the conveyer by the movement thereof, the fruit resting on the upwardly exposed brush surfaces of the conveyer. In this longitudinal movement the fruit is brought against the obliquely extending brush surfaces of the vertical brush means 12, the longitudinal movement continually tending to press the fruit against the deflector brush surface. At the same time the upper brushes 24, resting on the top of the fruit and extending obliquely, as above stated, tend to press the fruit toward the deflector brushes 12 as well as toward the brush conveyer surface, the fruit being thus confined between three brush surfaces and being rolled over and over and thoroughly cleaned in all parts by the joint action of such brush surfaces.

The angle of obliquity of the deflector brush surfaces to the longitudinal motion of the conveyer may be varied or adjusted to suit different conditions, by the adjusting means 21, 22. The height of the upper brushes 24 can be adjusted by sliding the adjusting bars 25 under the supporting bars 27 thereof, as stated, so as to serve for different sizes of fruit, and the angle of dip of these brushes can be varied by slipping the straps between the members 27, 29 as above stated.

Any suitable means may be used for supporting the upper brushes, said means being, however, such as to yieldingly support said brushes and to tend to draw the same toward the fixed deflector brush surface. Thus, as shown in Fig. 4, the upper brushes 24 may be supported by means of springs or flexible suspension means 37 connected to a supporting rod 38 and extending outwardly and downwardly therefrom to the brushes so that the weight of the brushes tends to swing them toward the fixed deflector brushes 12. The brushes 24 are connected by flexible strap means 39 so as to hold them approximately in proper relative position while allowing yielding motion thereof as the fruit passes thereunder.

In some cases it will be desirable to provide a plurality of deflectors operating successively. Thus in Fig. 5 are shown two deflectors 40 extending longitudinally and obliquely of the carrier or conveyer means 6, said deflectors being reversely directed so that the first deflector deflects the fruit toward one edge of the conveyer and the other deflector returns the fruit toward the other edge. The operative walls of said deflectors, that is the walls which face toward the feed end of the conveyer, are provided with brushes 41 to brush the fruit as it presses against the same, and top brushes 24 are also provided for pressing the fruit toward the brush conveyer 6 and toward the deflectors 40. It is not necessary that the deflectors should be fixed, but the same may be movable having, for example, motion in opposition to the motion of the conveyer means as shown in Fig. 6, wherein the deflector 43 is mounted on rolls 44 and is operated by suitable means shown at 45 to move in the direction of the arrow in opposition to the motion of the conveyer means 6, thereby increasing the rubbing action on the fruit in a given length of motion.

As the deflector extends obliquely across the conveyer, the fruit is continually deflected across the conveyer, by the action of the deflector, so that it is given a lateral as well as a longitudinal rolling motion, and its rotation is irregular, bringing all parts thereof in contact with the brushes, thus insuring the thorough brushing of all parts of the fruit, and avoiding the possibility of the fruit revolving continually on any given diameter and thus presenting only a portion of its surface to the brushing means. The conveyer is relatively wide so as to provide for this motion of the fruit across the conveyer as well as longitudinally with the conveyer. It will further be noted that the apparatus provides for rolling contact of the fruit against three surfaces, two of which, viz: the upper brushes and the deflector, are fixed and bear respectively near the top of the fruit and at one side thereof, and the other contact is with a moving surface under the bottom of the fruit, which applies to the fruit a motion opposite a point between the two points of contact with the stationary surfaces, and as the pressure on one of these stationary surfaces, viz: the deflector, is greater than on the other stationary surface, by reason of the motion of the conveyer pressing the fruit toward the deflector, it follows that the fruit is necessarily given the spiral or irregular rotation desired.

In my co-pending application Serial No. 356,279, filed February 7, 1907, I have shown and described one embodiment of my invention so far as the same relates to the provision of an open sided brushing conduit, preferably triangular in cross section and preferably having a top inclined downwardly toward the open side of the conduit and vertically movable, particularly as this portion of my invention is applied to a fruit cleaner in which the brushing and conveying surface is in the form of a horizontally rotating brush; while in this application I have shown this feature of my invention as applied to a fruit cleaner in which the brushing and conveying surface preferably consists of an endless belt, so that the conveying surface moves in a straight line during the travel of the fruit through the machine.

What I claim is:—

1. A fruit cleaner comprising a fruit conveyer consisting of an endless belt, means for moving said conveyer longitudinally, and a deflector extending above a portion of said conveyer in a direction oblique to the direction of motion of such conveyer, said conveyer having an upwardly exposed brush surface.

2. A fruit cleaner comprising a fruit conveyer consisting of an endless belt, means for moving said conveyer longitudinally, and a deflector extending above a portion of the conveyer in a direction oblique to the direction of motion of said conveyer, said deflector having a brush surface.

3. A fruit cleaner comprising a fruit conveyer consisting of an endless belt, means for moving said conveyer longitudinally, and a deflector extending above a portion of the conveyer in a direction oblique to the direction of motion of such conveyer, said conveyer having an upwardly exposed brush surface, and said deflector having a brush surface.

4. A fruit cleaner comprising a fruit conveyer consisting of an endless belt, means for moving said conveyer longitudinally, and a deflector extending above a portion of the conveyer in a direction oblique to the direction of motion of the conveyer, said conveyer having an upwardly exposed brush surface, and said deflector being adjustably mounted to vary its angle of obliquity to the motion of the conveyer.

5. A fruit cleaner comprising a fruit conveyer consisting of an endless belt, means for moving said conveyer longitudinally, and a deflector extending above a portion of the conveyer in a direction oblique to the direction of motion of the conveyer, said deflector having a brush surface and being adjustably mounted to vary its angle of obliquity to the motion of the conveyer.

6. A fruit cleaner comprising a fruit conveyer consisting of an endless belt and having an upwardly exposed brush surface, means for moving the conveyer longitudinally, a deflector extending above a portion of the conveyer in a direction oblique to the motion of the conveyer, and provided with a brush surface, and presser means provided with a surface facing obliquely downward from the deflector toward the conveyer.

7. A fruit cleaner comprising a fruit conveyer consisting of an endless belt, means for moving said conveyer longitudinally, a deflector extending above a portion of the conveyer in a direction oblique to the motion of the conveyer, said deflector having a brush surface, and upper brush means provided with a brush surface facing obliquely downward from the deflector toward the conveyer.

8. A fruit cleaner comprising a fruit conveyer consisting of an endless belt having an upwardly exposed brush surface, means for moving said conveyer longitudinally, a deflector extending above a portion of the conveyer in a direction oblique to the motion of the conveyer, said deflector having a brush surface, and upper brush means comprising a plurality of independently movable members, each provided with a brush surface facing obliquely downward from the deflector toward the conveyer.

9. A fruit cleaner comprising an endless belt constituting a conveyer and having an upwardly presented brush surface, a deflector extending obliquely above a portion of the belt, said deflector having a brush surface, a pivot at one end of the deflector for supporting it, and a slotted plate and a bolt at the other end for adjusting it.

10. A fruit cleaner comprising a movable conveyer having an upwardly presented brush surface, upper brushes above said conveyer having a downwardly presented brush surface and arranged in a direction oblique to the direction of motion of said conveyer, and a vertically disposed brush means extending along the side of said upper brushes.

11. A fruit conveyer comprising a movable conveyer having an upwardly presented brush surface, means for moving said conveyer longitudinally, and a plurality of longitudinally movable deflectors arranged side by side and extending obliquely above the conveyer and having a vertically disposed brush surface.

12. A fruit cleaner comprising an endless belt, a vertical brushing surface above the same and arranged at an angle thereto, an inclined brushing surface adjacent to and adapted to form a conduit with said other surfaces, and means for adjusting the inclined surface vertically and angularly relatively to said two surfaces.

13. A fruit cleaner comprising an endless belt, a vertical brushing surface arranged diagonally above the same, an inclined brushing surface adjacent to said surfaces, and means for yieldingly holding the inclined surface toward the vertical surface.

14. A fruit cleaner comprising a forwardly movable, horizontal brushing and cleaning surface, a vertical brushing surface arranged diagonally above the same, an inclined brushing surface adjacent to said two surfaces, and springs for yieldingly supporting said inclined surface and holding it toward the vertical surface.

15. A fruit cleaner comprising a forwardly movable, horizontal brushing and conveying surface, a diagonally arranged vertical brushing surface above the same, an inclined brushing surface with one edge adjacent to the vertical surface, and means for varying the angular adjustment of the vertical surface relatively to the line of movement of the first mentioned surface.

16. A fruit cleaner comprising a forwardly movable, horizontal brushing and conveying surface, a vertical brushing surface pivotally secured at one end so as to extend diagonally above said movable surface, means for securing the free end of said diagonal surface, a yielding, inclined brushing surface adjacent to said two surfaces, and adjustable means connected with the diagonal surface for supporting the inclined surface.

17. A fruit cleaner comprising an endless belt, a vertical brushing surface above the same and arranged at an angle thereto, and a brush surface arranged above and forming in conjunction with said movable brushing surface and said vertical brushing surface a substantially triangular brushing conduit extending obliquely to the movement of said conveyer surface.

In testimony whereof, I have hereunto set my hand at Los Angeles California this 12th day of March 1907.

FRED STEBLER.

In presence of—
Arthur R. Knight,
Frank L. A. Graham.